United States Patent
DelGaudio et al.

(10) Patent No.: US 9,928,480 B2
(45) Date of Patent: *Mar. 27, 2018

(54) METHOD AND SYSTEM FOR NETWORK CONNECTIVITY MIGRATION MANAGEMENT

(71) Applicant: PAYPAL, INC., San Jose, CA (US)

(72) Inventors: Carol I. DelGaudio, Williston, VT (US); Scott D. Hicks, Underhill, VT (US); William M. Houston, Newburgh, NY (US); Rachele Shannon Kurtz, Cary, NC (US); Victoria A. Hanrahan, Newburgh, NY (US); James A. Martin, Jr., Endicott, NY (US); Donald P. Mummey, Omaha, NE (US); Douglas G. Murray, Johnson City, NY (US); Jeffrey E. Prince, Bloomfield Hills, MI (US); Richard R. Pritsky, Williston, VT (US); Diane C. Rauch, Sunset Beach, NC (US)

(73) Assignee: PAYPAL, INC., San Jose, CA (US)

( * ) Notice: Subject to any disclaimer, the term of this patent is extended or adjusted under 35 U.S.C. 154(b) by 62 days.

This patent is subject to a terminal disclaimer.

(21) Appl. No.: 14/444,869

(22) Filed: Jul. 28, 2014

(65) Prior Publication Data
US 2014/0337187 A1 Nov. 13, 2014

Related U.S. Application Data

(60) Continuation of application No. 12/727,109, filed on Mar. 18, 2010, now Pat. No. 8,793,368, which is a
(Continued)

(51) Int. Cl.
*G06Q 40/00* (2012.01)
*G06Q 10/08* (2012.01)
(Continued)

(52) U.S. Cl.
CPC ......... *G06Q 10/087* (2013.01); *G06Q 20/203* (2013.01); *G06Q 40/02* (2013.01)

(58) Field of Classification Search
None
See application file for complete search history.

(56) References Cited

U.S. PATENT DOCUMENTS 5,678,044 A 10/1997 Pastilha et al.
5,930,806 A 5/1999 Taira et al.
(Continued)

*Primary Examiner* — Russell S Glass
(74) *Attorney, Agent, or Firm* — Haynes and Boone, LLP

(57) ABSTRACT

Disclosed are a method, system and computer program for collecting inventory data about a group of machines at an office. This method comprises the steps of running an inventory tool on each of the machines, and the tool presenting dialog displays on each of the machines, filling in or changing data in the dialogs presented by the tool, and submitting the collected information to a server. Also disclosed are a method, system and computer program for customizing an inventory data collection tool for a plurality of logical groups of users. Each of the logical groups of users is provided with a copy of the inventory data collection tool and with a first copy of a common control file. Each of the groups of users uses the first copy of the common control file to customize the tool for the group of users.

20 Claims, 22 Drawing Sheets

Related U.S. Application Data division of application No. 11/186,211, filed on Jul. 21, 2005, now Pat. No. 7,725,352, which is a continuation-in-part of application No. 10/728,520, filed on Dec. 4, 2003, now Pat. No. 7,685,027.

(51) Int. Cl.
 *G06Q 20/20* (2012.01)
 *G06Q 40/02* (2012.01)

(56) References Cited

U.S. PATENT DOCUMENTS

| | | | |
|---|---|---|---|
| 6,269,382 B1 | 7/2001 | Cabrera et al. | |
| 6,496,977 B1 | 12/2002 | Hamilton, II et al. | |
| 6,615,166 B1 | 9/2003 | Guheen et al. | |
| 6,728,877 B2 | 4/2004 | Mackin et al. | |
| 6,795,835 B2 | 9/2004 | Ricart et al. | |
| 7,725,352 B2 | 5/2010 | DelGaudio et al. | |
| 8,793,368 B2 * | 7/2014 | DelGaudio | G06Q 10/087 709/224 |
| 2002/0049749 A1 * | 4/2002 | Helgeson | G06F 9/468 709/203 |
| 2002/0069213 A1 | 6/2002 | Moslander et al. | |
| 2002/0073106 A1 | 6/2002 | Parker et al. | |
| 2003/0130980 A1 | 7/2003 | Bell et al. | |
| 2003/0167354 A1 | 9/2003 | Peppers et al. | |
| 2004/0095387 A1 * | 5/2004 | Demsey | G06F 9/4443 715/762 |
| 2004/0128203 A1 | 7/2004 | Pierre et al. | |
| 2004/0194055 A1 | 9/2004 | Galloway et al. | |
| 2005/0055357 A1 | 3/2005 | Campbell | |
| 2005/0086457 A1 | 4/2005 | Hohman | |
| 2007/0136722 A1 | 6/2007 | Lesher et al. | |

* cited by examiner

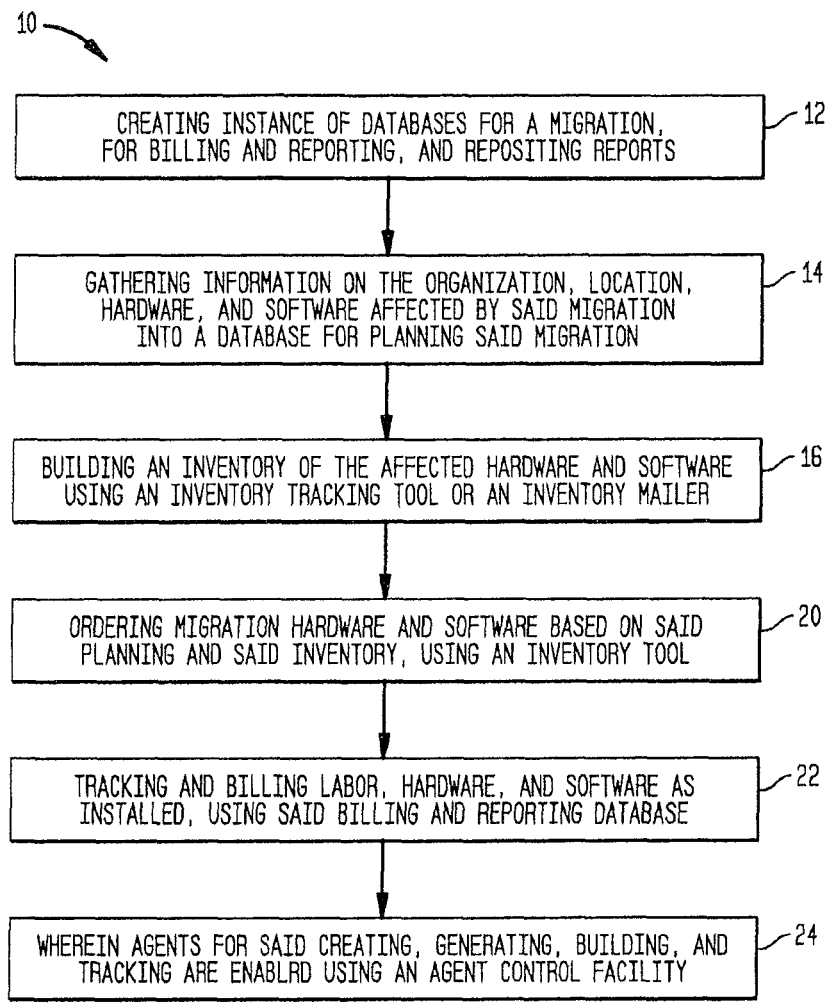

FIG. 2

| PROCESS | TOOLSUITE COMPONENT(S) |
|---|---|
| 32 — WORKLOAD PLANNING | -ETHERNET MIGRATION MANAGER (EMM) DATABASE |
| 34 — MACHINE/CLIENT INVENTORY INFORMATION GATHERING | -ETHERNET MIGRATION MANAGER INVENTORY TRACKING (EMMIT) TOOL<br>-MOBILE ETHERNET MIGRATION MANAGER INVENTORY TRACKING (MOBILE EMMIT) TOOL<br>-ADAPTER BY EXCEPTION (ABE) TOOL |
| 36 — CUSTOMER CONTACT MANAGEMENT | -ETHERNET MIGRATION MANAGER INVENTORY TRACKING MAILER (EMMIT MAILER) DATABASE<br>-ADAPTER BY EXCEPTION MAILER (ABE MAILER) DATABASE |
| 40 — DEPLOYABLE COMPONENT INVENTORY CONTROL AND FORECASTING | -ETHERNET MIGRATION MANAGER (EMM) DATABASE |
| 42 — LABOR TRACKING AND BILLING | -ETHERNET MIGRATION MANAGER (EMM) DATABASE<br>-ETHERNET MIGRATION MANAGER BILLING AND REPORTING (EMM BAR) DATABASE |
| 44 — DEPLOYABLE COMPONENT TRACKING AND BILLING | -ETHERNET MIGRATION MANAGER (EMM) DATABASE<br>-ETHERNET MIGRATION MANAGER BILLING AND REPORTING (EMM BAR) DATABASE<br>-ETHERNET MIGRATION MANAGER REPORT REPOSITORY (EMM RR) DATABASE |
| 46 — PROJECT REPORTING AND MEASUREMENTS | -ETHERNET MIGRATION MANAGER (EMM) DATABASE<br>-ETHERNET MIGRATION MANAGER BILLING AND REPORTING (EMM BAR) DATABASE<br>-ETHERNET MIGRATION MANAGER REPORT REPOSITORY (EMM RR) DATABASE |
| 50 — DATABASE INSTANCE CREATION, MANAGEMENT AND CONFIGURATION | -EMM INSTANCE MANAGER (EMM IM) DATBASE<br>-EMM DOCUMENTATION AND RULES (EMM DR) DATABASE |
| 52 — CENTRALIZED DATA PROCESSING AGENT EXECUTION | -EMM AGENT CONTROL (EMM AC) DATABASE |
| 54 — CLIENT INFORMATION ORGANIZATIONAL AND LOCATION INFORMATION | -CLIENT INFOMATION REPOSITORY (INFO.NSF) DATABASE |

FIG. 3

| TOOLSUITE COMPONENT | DESCRIPTION |
|---|---|
| ETHERNET MIGRATION MANAGER (EMM) DATABASE | A LOTUS DOMINO DATABASE WHICH CONTAINS ONE ENTRY FOR EACH CLIENT AND/OR MACHINE AND/OR DEVICE BEING EFFECTED BY THE MIGRATION. EACH ENTRY CONTAINS INFORMATION ABOUT THE OWNER, LOCATION, MIGRATION STATUS, LABOR REQUIED, COMPONENT(S) DELIVERED, ETC. |
| ETHERNET MIGRATION MANAGER INVENTORY TRACKING (EMMIT) TOOL | A WINDOWS EXECUTABLE WHICH GATHERS INFORMATION ABOUT A CLIENT AND/OR MACHINE AND/OR DEVICE AND TRANSMITS THIS INFORMATION TO EMM. |
| MOBILE ETHERNET MIGRATION MANAGER INVENTORY TRACKING (MOBILE EMMIT) TOOL | A WINDOWS EXECUTABLE (MAILABLE TO REMOTE EMPLOYEES) WHICH GATHERS INFORMATION ABOUT A CLIENT AND/OR MACHINE AND/OR DEVICE AND TRANSMITS THIS INFORMATION TO THE EMMIT MAILER. |
| ETHERNET MIGRATION MANAGER INVENTORY TRACKING MAILER (EMMIT MAILER) DATABASE | A LOTUS DOMINO DATABASE WHICH CONTAINS ONE ENTRY FOR EACH REMOTE EMPLOYEE WHO HAS BEEN SENT THE EMMIT MAILER TOOL. |
| ADAPTER BY EXCEPTION (ABE) TOOL | A WINDOWS EXECUTABLE (MAILABLE TO EMPLOYEES REQUIRING MIGRATION UPON DEMAND) WHICH GATHERS INFORMATION ABOUT A CLIENT AND/OR MACHINE AND/OR DEVICE AND TRANSMITS THIS INFORMATION TO EMM. |
| ADAPTER BY EXCEPTION MAILER (ABE MAILER) DATABASE | A LOTUS DOMINO DATABASE WHICH CONTAINS ONE ENTRY FOR EACH REMOTE EMPLOYEE WHO HAS BEEN SENT THE ABE TOOL. |
| ETHERNET MIGRATION MANAGER BILLING AND REPORTING (EMM BAR) DATABASE | A LOTUS DOMINO DATABASE WHICH CONTAINS IN ONE PLACE ALL INFORMATION FROM ALL ENTERPRISE INSTANCES OF EMM. |
| ETHERNET MIGRATION MANAGER REPORT REPOSITORY (EMM RR) DATABASE | A LOTUS DOMINO DATABASE WHICH CONTAINS ALL BILLING REPORTS AND SNAPSHOT DATAPOINTS TO SUPPORT DELTA BILLING PROCESS. |
| EMM INSTANCE MANAGER (EMM IM) DATABASE | A LOTUS DOMINO DATABASE WHICH CONTAINS ONE ENTRY FOR EACH ENTERPRISE INSTANCE OF EMM. INSTANCE STATUS, GEOGRAPHY, ETC. INFORMATION IS MANAGED HERE. |
| EMM DOCUMENTATION AND RULES (EMM DR) DATABASE | A LOTUS DOMINO DATABASE WHICH CONTAINS DOCUMENTATION AND CONFIGURABLE RULES COMMON TO ALL INSTANCES OF EMM. IT IS USED TO AUTOMATICALLY DISTRIBUTE UPDATES OF THIS INFORMATION TO ALL INSTANCES. |
| EMM AGENT CONTROL (EMM AC) DATABASE | A LOTUS DOMINO DATABASE WHICH CONTAINS ONE ENTRY FOR EACH ENTERPRISE INSTANCE OF EMM. A SERIES OF DATA PROCESSING AGENTS MAY BE ENABLED/DISABLED FOR ALL ENTERPRISE INSTANCES. THIS DATABASE ALSO CONTAINS THE DATA PROCESSING AGENT SCHEDULING AND PERFORMS THE ACTUAL AGENT EXECUTIONS. |
| CLIENT INFOMATION REPOSITORY (INFO.NSF) DATABASE | A LOTUS DOMINO DATABASE WHICH CONTAINS CENTRALIZED EMPLOYEE ORGANIZATIONAL AND LOCATION INFOMATION FOR EFFICIENT USE BY OTHER TOOLSUITE COMPONENTS. |

FIG. 6

→ DROP DOWN SELECTABLE CHOICES AND FIELD REQUIREMENTS DEFINED IN LOCAL SITE
INITIALIZATION FILE (.ini file)

THE EMPLOYEE SERIAL NUMBER OR LAST NAME AND TIE-LINE USED
TO PULL INFO FROM BLUEPAGES.

**THE TOOLS ATTEMPTS TO LOCATE ALL INFO ON THIS SCREEN ON ITS
OWN. IF IT CANNOT YOU MUST ENTER IT MANUALLY

LOCATION INFORMATION PULL DOWNS ARE DEFINED IN SITE .ini file

MOVERS REQUIRED IS USED AS A "flag." IT WILL PUT THIS RECORD
IN A VIEW CALLED MOVERS REQUIRED IN THE DB.

YOU MUST VERIFY EACH NETWORK CARD IN THE LIST. SELECT THE
CARD NAME AND PRESS 'Edit'.

EMMIT Machine Data (V2.0.2)

Owner/User
*Serial: 2A6747   Unknown       *Tie: 532-B570   Look Up
***Last Name: Locke Location Information
*Site: East Fishkill        *Movers Required: ○ Yes ⊙ No
*Building: 3300  *Floor: 2   Office 2BDE2B-49

Machine Information
*Mfg.: IBM        *Serial: 7BCRG5   Unknown
*Type: 2652
*Model: D3U       *OS: Windows 2000
Type N/A  Model N/A  *Version: C4EB 1.1.006 AM Fix Level 00

Network Cards or Drivers Found
Vfy Sup Port ID   Card Name
  Yes        Intel(R) PRO/100 VE Network Connection
  No         Symbol LA-4lx1 Spectrum24 Wireless LAN PC Card — 126

Add   Edit   Remove         Recommended Adapter — 128

<Previous   Next>           Prefill            Cancel

EMMIT Networking Information (V1.7.2)

*Card Name: Intel(R) PRO/100 VE Network Connection
*Verify Card Exists: ⦿ Yes ○ No ○ Unknown
*Cable ID: 12345  Can not read port ID
*Static Address Required: ○ Yes ⦿ No
Static Address Justification:
Host Name: vicky1
Address: 0.0.0.0
Is there a splitter on this port: ○ Yes ⦿ No

[OK]  [Cancel]

— 132

YOU MUST VERIFY WETHER OR NOT THE CARD IS IN THE MACHINE. VERIFY THE CARD BY CHOOSING YES OR NO

ENTER THE LAN JACK NUMBER. IF IT IS BLOCKED PRESS THE BUTTON "Cannot read port ID"

IF A STATIC ADDRESS IS REQUIRED SELECT 'Yes' AND CHOOSE A JUSTIFICATION FROM THE DROP-DOWN

IF THERE IS A SPLITTER ON THE PORT CHOOSE YES. THERE IS A VIEW IN THE DB THAT WILL SHOW THESE RECORDS.

FIG. 9

YOU MUST NOW CHOOSE THE TYPE OF MIGRATION:

INVENTORY ONLY- NO MIGRATION IS BEING DONE AT THIS TIME
(IF THIS CHOSEN YOU WILL GO DIRECTLY TO THE LAST SCREEN ASKING
YOU TO SEND THE DATA OR SAVE IT.)

SELF INSTALL- THE USER WILL DO THE INSTALL ON THEIR OWN

SHOPPING CART INSTALL- DSR HAS THE ADAPTER REQUIRED AND WILL DO
THE MIGRATION AT THIS TIME

NOT TO BE MIGRATED- THIS MACHINE WILL NOT BE MIGRATED TO ETHERNET
AT ALL.

ADAPTER JUST INSTALLED: IF THERE WAS A RECOMMENDED ADAPTER
THAT APPEARED IN THE PREVIOUS SCREEN AND WAS VERIFIED AS BEING IN
THE MACHINE THIS OPTION WILL APPEAR.
CHOOSE:
YES- IF YOU JUST INSTALLED THIS CARD FOR THE CLIENT, THIS WILL BE THE
    ADAPTER THAT APPEARS IN THE 'Adapter Installed' FIELD.
NO- IF THIS CARD WAS ALREADY IN THE MACHINE. (THE MACHINE DID
    NOT NEED A CARD TO BE INSTALLED WHICH= NONE REQUIRED AS
    THE 'Adapter Installed')

---

EMMIT Migration Type (V2.0.2)                    134

Migration Type
Choose the type of migration desired
  ○ Inventory Only
  ○ Self Install
  ⊙ Shopping Call Install
  ○ Not to be migrated Adapter Just Installed
Was the supported adapter that you verified installed during this visit?
  ○ Yes  ⊙ No
                                                  140

<Previous    Next>                              Cancel

FIG. 10

EMMIT Machine Data (V2.0.2)

Installer
Global Services  ○ Yes  ● No
Victoria A. Locke/Fishkill/IBM

Migration
● Complete          ☐ Rescheduled  2/14/2003  10:49AM
○ Not Complete      Reason  Other (See Comments)

Installed Hardware
Supplied by customer  ○ Yes  ● No
Adapter  None Required
MDOs  0
MDO  SMCEZ6505TX  None Required Labor
     Hrs Inventory Min  Hrs Installation Min  Hrs Other Min
      0      10    0     0              0      0         0

Comments

<Previous    Next >                                    Cancel 142
144 — INSTALLER:
       FOR SELF INSTALL
         GS INSTALLER = NO
       UNLESS, YOU MANUALLY CHANGE IT TO YES.

146 — MIGRATION:
       IN THIS CASE THE RECORD IS COMPLETE BECAUSE THERE IS A
       CARD IN THE MACHINE
       OTHERWISE, IF COMPLETE CHOOSE YES, IF IT IS NOT CHOOSE
       NO.
       THE SCHEDULED DATE AND TIME DEFAULTS TO THE PRESENT TIME
       IF NOT COMPLETE YOU CAN CHOOSE A SCHEDULED DATE AND
       CHOOSE THE REASON WHY IT IS NOT COMPLETE

150 — INSTALLED HARDWARE:
       IN THIS CASE THERE WAS NO ADAPTER REQUIRED.
       IF AN ADAPTER WAS REQUIRED CHOOSE THE ONE INSTALLED FROM
       THE DROP DOWN LIST.

CABLES: THE DEFAULT IS 1. IF NO CABLE IS LEFT CHANGE THIS TO 0.

RITs: IF A RIT WAS USED, RECORD THE NUMBER

MDOs: IF AN MDO DEVICE WAS INSTALLED CHOOSE A
       NUMBER AND THEN CHOOSE THE DEVICE NAME FROM THE LIST.

152 — LABOR: ENTER INVENTORY, INSTALLATION AND ANY OTHER
       (BREAK/FIX) LABOR.

FIG. 11

INSTALLER:
FOR SHOPPING CART, GS INSTALLER = YES

CHOOSE THE INSTALLERS NAME FROM THE LIST

MIGRATION:
IN COMPLETE CHOOSE YES, IF IT IS NOT CHOOSE NO.
THE SCHEDULED DATE AND TIME DEFAULTS TO THE PRESENT TIME

IF NOT COMPLETE, YOU MUST CHOOSE THE REASON WHY

INSTALLED HARDWARE:
IN THIS CASE THERE WAS NO ADAPTER REQUIRED. THERE WAS ALREADY A SUPPORTED CARD IN THE MACHINE.

IF AN ADAPTER WAS REQUIRED CHOOSE THE ONE INSTALLED FROM THE DROP DOWN LIST.

THE RECOMMENDED ADAPTER APPEARS NEXT TO THE ADAPTER FIELD

CABLES: THE DEFAULT IS 1. IF NO CABLE IS LEFT CHANGE THIS TO 0.

RITs: IF A RIT WAS USED, CHANGE TO 1

MDOs: IF AN MDO DEVICE WAS INSTALLED CHOOSE A NUMBER AND THEN CHOOSE THE DEVICE NAME FROM THE LIST.

LABOR: ENTER INVENTORY, INSTALLATION AND ANY OTHER (BREAK/FIX) LABOR.

FIG. 13

IF NOT TO BE MIGRATED IS CHOSEN THE NO
MIGRATION SCREEN WILL APPEAR NEXT

MIGRATION:
CHOOSE A REASON FOR NO MIGRATION

IF TOKEN RING EXCEPTION IS CHOSEN YOU WILL HAVE
THE OPPORTUNITY TO ENTER A TARGET DATE FOR
CONVERSION.

ENTER INVENTORY LABOR

EMMIT No Migration Data(V2.0.2)

Migration
Reason For No Migration [Employee Leaving Location ▼]  — 172
Target Date [2/14/2003 ▼]

Justification

Labor
Inventory Hours [0 +/-]  Minutes [10 +/-]  — 174

Comments

[<Previous]  [Next>]  [Cancel]

ENTER THE SERIAL NUMBER OR LAST NAME AND TIE-LINE
AND LOCATION INFO

FIG. 16

SPECIAL NEEDS:

THE SPECIAL NEEDS SCREEN IS OPTIONAL.
THE ini file DETERMINES THE CHOICES ON THIS SCREEN
IF YOU WOULD LIKE THIS SCREEN FOR YOUR SITE PLEASE CONTACT
EMM SUPPORT.

190

EMMIT Special Needs (V1.2.0)

Needs
- ☐ SMA
- ☐ NetBEUI
- ☐ NetBIOS/NetBEUI
- ☐ UDP Forwarding
- ☐ IPX
- ☐ Apple Talk
- ☐ RIP
- ☐ DSPF
- ☐ VMware + Multiple MACs
- ☐ Other + describe in comments Comments

[<Previous]  [Next >]  [Cancel]

FIG. 17

- INVENTORY DATA COLLECTED VIA EMMIT; DATA PULLED INTO EMM DATABASE
    - 2.0 PORT
        - ALL PORTS TO BE MIGRATED
    - 3.0 MACHINE
        - PHYSICAL INVENTORY: ALL NETWORK CONNECTED DEVICES: PC, RISC, NETWORK PRINTERS, ETC.
    - 4.0 ADAPTER
        - ADAPTER DEMAND FORECASTING AND ORDERING
        - COST ACCOUNTING - DISTRIBUTION OF CHARGES TO CUSTOMERS BASED ON MIGRATIONS
    - 5.0 NETWORK
        - ASSIGNMENT OF TCPIP ADDRESSES
        - RECORDING OF PORTS USED FOR EACH SYSTEM
        - NETWORK TEAM CAN SEE WHEN PEOPLE ARE SCHEDULED
    - 6.0 SCHEDULING
        - MIGRATION SCHEDULING
        - WORK ORDER PREPARATION FOR INSTALLERS
        - WORK COMPLETION RECORD
        - PROJECT TRACKING AND STATUS REPORTING
        - COST ACCOUNTING- DISTRIBUTION OF DESKSIDE CHARGES TO CUSTOMERS BASED ON WS POPULATION (USE FOR INPUT TO ManageNow)
    - 9.0 GENERAL
        - INSTALL TEAM SUMMARIES (FOR TIME)

METHOD AND SYSTEM FOR NETWORK CONNECTIVITY MIGRATION MANAGEMENT

CROSS-REFERENCE TO RELATED APPLICATIONS

This application is a continuation of Ser. No. 12/727,109, filed Mar. 18, 2010, which is a divisional application of Ser. No. 11/186,211, filed Jul. 21, 2005, now U.S. Pat. No. 7,725,352, which is a continuation-in-part of Ser. No. 10/728,520, filed Dec. 4, 2003, now U.S. Pat. No. 7,685,027, all of which are incorporated herein by reference in their entirety.

BACKGROUND OF THE INVENTION

Field of the Invention

This invention generally relates to managing and effecting an enterprise-wide technology migration, and more specifically, to an integrated set of tools and processes to manage an enterprise-wide information technology migration.

Background Art

Many corporations and other enterprises have very extensive information technology or telecommunications systems or networks. These systems may include personal computers, workstations, servers, printers, monitors, data storage facilities, as well as the many software applications used on these devices and all the wiring, cabling and connectors needed to interconnect the system or network components.

From time to time, it is necessary or desirable to make extensive or fundamental changes in or to these networks or systems. For instance, an enterprise may want to migrate from one basic type of network to another. Examples of such migration include: Token-ring to Ethernet; Windows to LINUX; Dell PCs to IBM PCs; Microsoft Exchange/Outlook to Lotus Notes; and phone system migrations These migrations, because of the large number of pieces of equipment involved, the disparate nature of these pieces of equipment, and the complex relationships between the equipment, can be very difficult, complicated and expensive to manage. There does not exist in the prior art a configurable, integrated and end-to-end set of processes and corresponding electronic toolsuite to manage effectively large scale enterprise-wide information technology-related or telecommunications-related migrations.

A number of specific challenges may be faced in the course of a large scale, enterprise-wide migration. For example, when preparing for a large migration of any type, the first step is to see what the status of the existing machine is. Because of the large number of and very diverse nature of those machines, it may be difficult to provide a manageable process and tool to do this.

Another challenge is that, whenever a large migration project is done, there are always targeted users that do not get completed during the planned window. There can be many reasons for this, including users on vacations, or otherwise not available during the migration window. Processes and tools need to be provided that allow a user to collect the desired inventory data outside of the window of time when the other inventory methods are being used.

In addition, during a large migration project, data is collected about each client. Each logical group of clients often has custom requirements. For instance, clients in Canada may not use the RIT connectors or need to mail card and cables. While a new tool could be developed for each of these logical groups of clients, this is a time consuming and cumbersome task. It is much more desirable to provide a single, configurable tool that can be customized for each of these logical groups of users.

In accordance with a second aspect of the invention, a method, system and computer program are provided for customizing an inventory data collection tool for a plurality of logical groups of users. The method comprises the steps of providing an inventory data collection tool, providing a common control file to customize the tool for each of said logical groups of users, and providing each of the logical groups of users with a copy of the inventory data collection tool and with a first copy of said common control file. Each of the groups of users uses said first copy of the common control file to customize the tool for said each of the groups of users.

In a preferred implementation of this aspect of the invention, a copy of the common control file is stored on a server that copy of the common control file on the server is updated, and each of the logical groups of users is provided with access to the copy of the common control file on the server. In this way, each of the logical groups of users has the option of using either the copy of the common control file on the server, or the first copy of the common control file provided to said each of the logical groups of users with the tool.

SUMMARY OF THE INVENTION

An object of this invention is to provide a comprehensive and integrated set of processes and tools to manage large-scale information-related migrations.

Another object of the invention is to provide a configurable, integrated and end-to-end set of processes and corresponding electronic toolsuite to manage effectively large-scale enterprise wide information technology-related or telecommunications related migrations.

An object of this invention is to provide an improved procedure and tool for collecting machine information for a large scale equipment migration.

Another object of the invention is to provide a desk side representative with an improved, flexible and configurable tool for collecting inventory data needed for a large scale equipment migration.

A further object of the present invention is to provide a control file for an inventory data allocation tool that enables users to customize the information gathering per each logical group of users.

Another object of the invention is to locate an improved common control file for an inventory data collection tool on a central server, and to enable each of a plurality of users of the tool to download the control file in order to customize the tool for their own use.

An object of this invention is to download an inventory data collection tool over a network, such as the Internet, to a computer.

Another object of the invention is to enable a client computer of a network to process an inventory data file generated by another computer of the network.

These and other objectives are attained with a method of and system for enterprise-wide migration. The method comprises the steps of creating instances of databases for a migration, for billing and reporting, and repositing reports; gathering information on the organization, location, hardware, and software affected by said migration into a database for planning said migration; and building an inventory of the affected hardware and software using an inventory tracking tool or an inventory mailer.

Migration hardware and software is ordered based on said planning and said inventory, using an inventory tool; and labor, hardware, and software as installed are tracked and billed, using said billing and reporting database. Agents for said creating, gathering, building and tracking are enabled using an agent control facility.

In a preferred embodiment, the database for planning includes one entry for each device affected by the migration, and the built inventory is transmitted into the database for planning. Also, preferably, the agent control facility includes an agent control database, and this database performs the agent executions.

In accordance with one aspect of the invention, a method, system and computer program are provided for collecting inventory data about a group of machines at an office. This method comprises the steps of running an inventory tool on each of said machines, and the tool presenting dialogue displays on each of the machines. The method comprises the further steps of filling in or changing data in the dialogues presented by the tool; and submitting the collected information to a server.

In a preferred embodiment, the machine is physically migrated if the needed hardware/software is available. Also, in the preferred embodiment, a desk side representative visits the office, runs said inventory tool on each of said machines, and fills in or changes data in the dialogue presented by the tool. As an alternative, the tool may be downloaded to the physical group of users over a network such as the Internet.

In accordance with another aspect of the invention, a system is provided for collecting inventory data about a group of machines at an office. This system comprises an inventory tool; means to run said inventory tool on said machines, wherein said tool presents dialogue displays on each of the machines; means for filling in or changing data in the dialogues presented by the tool; and means for submitting the collected information to a server.

Preferably, this system further comprises, for each of said machines, means for physically migrating the machine. Also, preferably, a desk side representative visits the office, and said desk side representative operates said means for running said inventory tool on each of said machines. Also, preferably, the desk side representative operates said means for filling in or changing data in the dialogue presented by the tool. With one embodiment, inventory tool is downloaded over a network to at least one of the machines of said group. With another embodiment, a desk side representative visits the office and brings the inventory tool to said office.

In accordance with another aspect of the invention, a system is provided for customizing an inventory data collection tool for a plurality of logical groups of users. This system comprises an inventory data collection tool; a common control file to customize the tool for each of said logical groups of users; and means for providing each of the logical groups of users with a copy of the inventory data collection tool and with a first copy of said common control file; and wherein each of the groups of users uses said first copy of the common control file to customize the tool for said each of the groups of users.

Preferably, a copy of the common control file is stored on a server, and the system further comprises means for updating the copy of the common control file on the server; and means for providing each of the logical groups of users with access to the copy of the common control file on the server; and wherein each of the logical groups of users has the option of using either the copy of the common control file on the server, or the first copy of the common control file provided to said each of the logical groups of users with the tool.

Preferably, said first copy of the common control file includes means to warn one of said users that the said one of the users is using said first copy of the common control file. Also, preferably, the means to warn includes means to warn said one of said users that said one of the users is not using said copy of the common control file from said server. With one embodiment, each of the logical groups of users is given the inventory data collection tool with said first copy of said common control file already on the inventory data collection tool. With another embodiment, said inventory data collection tool is downloaded over a network to at least one of said each of the logical groups of users.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIG. 1 is a flow chart showing an embodiment of the invention.

FIG. 2 is a table listing a number of processes that may be used in the practice of this invention, and for each of these processes, one or more toolsuite components or databases, with a representative implementation noted, that may be used to carry out the process.

FIG. 3 is a table that describes in greater detail the toolsuite components and databases listed in FIG. 2.

FIG. 6 illustrates a screen used to obtain additional basic inventory data.

FIG. 8 shows a screen that may be used to collect information about cards on a computer being inventoried.

FIG. 9 illustrates a screen used to identify a type of equipment migration.

FIG. 10 shows a screen that is a dialogue box relating to the equipment migration.

FIG. 11 illustrates a screen that can be displayed when a "Shopping Cart" type of migration is selected.

FIG. 13 shows a screen that may be displayed if a computer is not being migrated.

FIG. 14 shows a screen used to input data if the computer user is not available.

FIG. 16 illustrates a screen that gives a list of special needs that a particular machine may have.

FIG. 17 identifies inventory data that may be collected using the present invention.

DETAILED DESCRIPTION OF THE PREFERRED EMBODIMENTS

Figure 4:
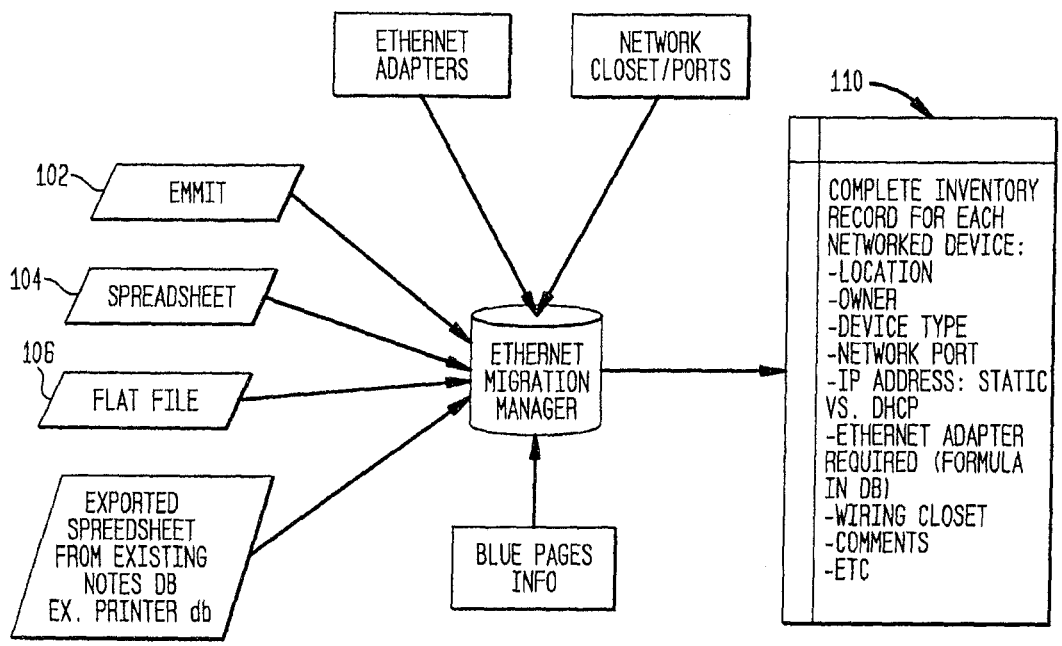
FIG. 4 shows a number of services that may be used to provide inventory data.

As previously mentioned, many enterprises have very extensive information technology or telecommunications systems or networks, and a system or network migration can be expensive, time-consuming and difficult to effect and manage. The present invention provides a configurable, integrated and end-to-end set of processes and corresponding toolsuite to manage effectively a large-scale enterprise wide information technology-related or telecommunications related migration.

FIG. 1 shows a preferred method 10 for implementing this invention. At step 12, instances of databases are created for the migration; and these databases may be used for billing and reporting, and repositing reports. At step 14, information is gathered on the organization, location, hardware and software affected by the migration, and this information is gathered into a database for purposes of planning the migration. Next, at step 16, an inventory is built of the affected hardware and software using an inventory tracking tool or an inventory mailer.

At step 20, migration hardware and software is ordered based on the above-mentioned planning and inventory, using an inventory tool. Step 22 of this method is to track and bill for labor, hardware and software as installed, using the billing and reporting database. As represented by step 24, agents are used for the creating, gathering, building and tracking, and these agents are enabled using an agent control facility.

FIG. 2 identifies processes that may be used in a specific example of the present invention. The discussion given below uses a corporate Ethernet Migration toolsuite and processes as the example of the invention.

FIG. 2 identifies ten specific processes: Workload planning 32; Machine/client inventory information gathering 34; Customer contact management 36; Deployable component inventory control and forecasting 40; Labor tracking and billing 42; Deployable component tracking and billing 44; Project reporting and measurements 46; Database instance creations management and configuration 50; Centralized data processing agent execution 52; and Client information organizational and location information 54. Each of these processes is discussed in more detail below.

Workload planning 32 includes creating an instance of a database for the enterprise. As indicated in FIG. 2, this may be done using the Ethernet Migration Manager (EMM) database.

Machine/client inventory information 34 may include, for example, information about the number, make and models of the computers and printers in the system, and this information can be collected in a number of ways. The information can be obtained by the customer, or by the service provider. Also, in some cases, the customer or the service provider may already have this information, in which case, the data can be directly imported into the database used for the migration. As represented in FIG. 2, this information can be gathered using the Ethernet Migration Manager Inventory Tool (EMMIT), the Mobile Ethernet Migration Manager Inventory Tool (Mobile EMMT), and the Adapter By Exception (ABE) tool.

The third process, customer contact management 36, shown in FIG. 2 is used to keep track of contact between the customer and the service provider. Any suitable tool or tools may be used to implement this process. For example, as indicated in FIG. 2, this process may be implemented using the Ethernet Migration Manager Inventory Tool Mailer (EMMIT Mailer) database, and the Adapter By Exception Mailer (ABE Mailer) database.

The Deployable component inventory control and forecasting process 40 is done to determine the hardware that needs to be ordered for the customer. This hardware may include, for example, adapters, patch-cables, RIT connectors, and MDO devices. This process may be performed using the Ethernet Migration Manager (EMM) database.

Throughout the migration process, it is necessary to keep track of the labor that was done and to bill for this labor. Process 42, Labor tracking and billing, does this. Specifically, this process may be performed using the Ethernet Migration Manager (EMM) database, and the Ethernet Migration Manager Billing and Reporting (EMM BAR) database.

The next process 44, Deployable component tracking and billing, listed in FIG. 2, is used to keep track of and to bill for the hardware components that are installed in the customer system. Any suitable tools may be used for this purpose. For instance, as shown in FIG. 2, these tools may include the Ethernet Migration Manager (EMM) database, the Ethernet Migration Manager Billing and Reporting (EMM BAR) database, and the Ethernet Migration Manager Report Repository (EMM RR) database.

Throughout the whole migration process, reports are prepared and kept track of, and the Project reporting and measurement process 46 is used to do this. In particular, FIG. 2 lists three databases that may be used in this process, including the Ethernet Migration Manager (EMM) database, the Ethernet Migration Manager Billing and Reporting (EMM BAR) database, and the Ethernet Migration Manager Report Repository (EMM RR) database.

The next process 50, Database instance creation, management and configuration, is used to manage the overall migration. In particular, this process is used to identify new instances, manage the instance database and to create new databases. Two specific databases may be used for this purpose: the EMM Instance Manager (EMM IM) database, and the EMM Documentation and Rules (EMM DR) database. This latter database is used to maintain all the pertinent data in one place.

The Centralized data processing agent execution process 52 is provided to manage all the agent programs that are used to run the instances utilized in the migration. The EMM agent control (EMM AC) database may be used for this purpose.

The tenth process listed in FIG. 2 is Client information organizational and location information 54. This process may be used to maintain information about, for example, the customer's employees. Preferably, all of this information is kept in one database, the Client Information Repository (INFO NSF) database.

FIG. 3 is a table that gives more information about the specific databases and tools referred to in FIG. 2. With reference to FIG. 3, the Ethernet Migration Manager (EMM) database 60 is a Lotus Domino database which contains one entry for each client and/or machine and/or device being affected by the migration. Each entry contains information about the owner, location, migration status, labor required, components(s) delivered, etc. The Ethernet Migration Manager Inventory Tool (EMMIT) 62 is a Windows executable, which gathers information about a client and/or machine and/or device and transmits this information to EMM. The Mobile Ethernet Migration Manager Inventory Tool (Mobile EMMIT) 64 also is a Windows executable (mailable to remote employees), which gathers information about a client and/or machine and/or device and transits this information to the EMMIT Mailer.

The Ethernet Migration Manager Inventory Tool Mailer (EMMIT Mailer) database 66 is a Lotus Domino database which contains one entry for each remote employee who has been sent the EMMIT Mailer tool. The Adapter By Exception (ABE) tool 70 is a Windows executable (mailable to employees requiring migration upon demand) which gathers information about a client and/or machine and/or device and transmits this information to EMM. The Adapter By Exception mailer (ABE Mailer) database 72 is a Lotus Domino database which contains one entry for each remote employee who has been sent the ABE tool.

The Ethernet Migration Manager Billing and Reporting (EMM BAR) database 74 is a Lotus Domino database which contains in one place all information from all enterprise instances of EMM. The Ethernet Migration Manager Report Repository (EMM RR) database 76 is another Lotus Domino database which contains all billing reports and snapshot data points to support delta billing process. The EMM Instance Manager (EMM IM) database 80 is a Lotus Domino database which contains one entry for each enterprise instance of EMM. Instance status, geography, etc., information is managed in this database.

The EMM Documentation and Rules (EMM DR) database 82 is a Lotus Domino database which contains documentation and configurable rules common to all instances of EMM. It is used to automatically distribute updates of this information to all instances. The EMM Agent Control (EMM AC) database 84 is another Lotus Domino database which contains one entry for each enterprise instance of EMM. A series of data processing agents may be enabled/disabled for all enterprise instances. This database also contains the data processing agent scheduling and performs the actual agent executions. The Client Information Repository (INFO.NSF) database 86 is a Lotus Domino database, which contains centralized employee organizational and location information for efficient use by other toolsuite components.

In accordance with one aspect of the invention, a procedure and tool are provided for collecting machine information for a large scale migration by desk side representatives (DSR). Generally, in this aspect of the invention, a DSR visits each workstation and runs a tool that collects required data about the workstation and sends it back to a collection server. If the tool cannot be run on the workstation, then it can be run on some other workstation and the data can be entered manually to complete the inventory.

More specifically, the preferred embodiment of this aspect of the invention comprises the following steps:
1. DSR visits an office;
2. Run the EMM IT tool on the machine;
3. Fill in or change the data in the dialogs presented by the tool;
4. Physically migrate the machine if the needed hardware/software is available; and
5. Submit the collected information to the server.

FIGS. 4-17 illustrate this aspect of the invention. As shown in FIG. 4, a number of sources can be used to provide the necessary or desired inventory data to the migration manager. For instance, inventory tool 102 may be used, a spreadsheet 104 may be used, or a flat file 106 may be used. FIG. 4 also shows a desired inventory record 110. As indicated therein, this record may include, for each network device, the location, owner, device type, network port, IP address, whether the IP address is static or DHCP, the required adapter, and the wiring closet; and preferably, the inventory record also provides an area or space for comments. As will be understood by those of ordinary skill in the art, the record may include more or less information than as shown in FIG. 4.

Preferably, the inventory tool 102 is designed to run on any Windows Client, and is designed to run a network connected or stand-alone windows system to collect inventory and network information. Also, the inventory tool, preferably, includes an INI file that controls all of the configurable features for the pull down menus in each screen, and the tool provides input checking. For example, the inventory tool may be designed so that if data entered does not match a template, an error message is displayed.

Figure 5:
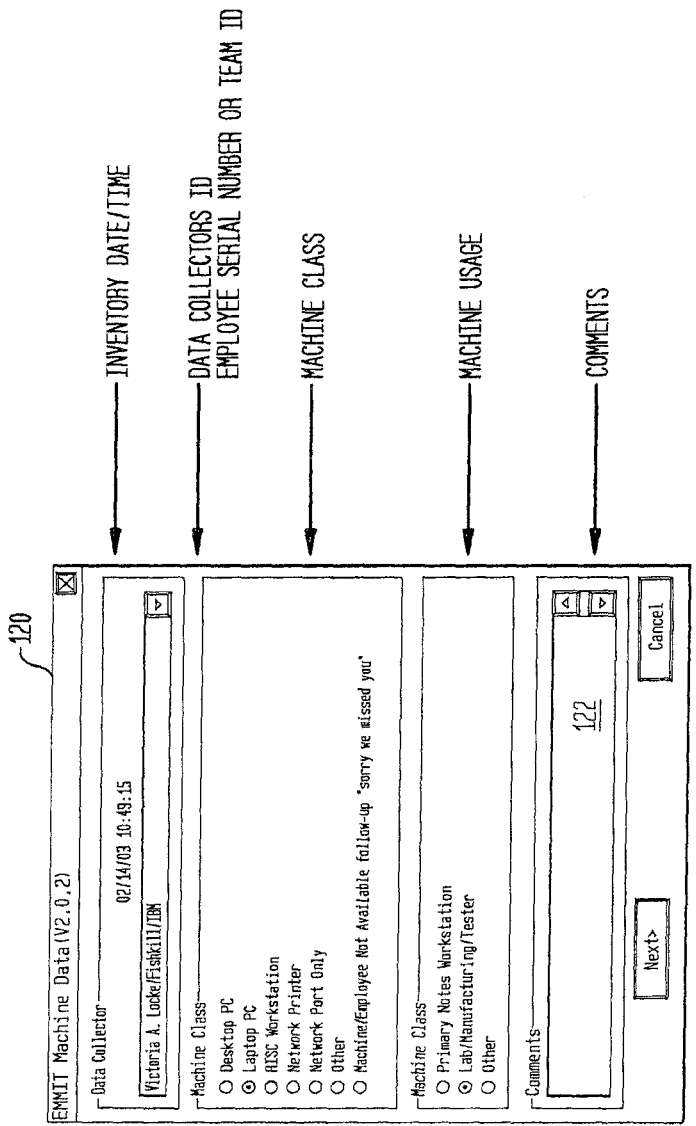
FIG. 5 shows a screen that may be used, in the present invention, to obtain.

FIG. 5 shows a screen 120 used to obtain basic data such as the inventory data and time, the data collector's ID, the machine class, and machine usage. This screen also includes an area 122 for comments.

FIG. 6 shows a screen 124 with additional basic information. For example, this screen provides the name and identification information about the workstation user, information about the location of the workstation, and other information about the workstation. Preferably, this other information also includes a list 126 of the network cards on the computer. Also, preferably, most or all of this information is pre-filled, with the data collector having the option to change the data.

Figure 7:
FIG. 7 shows the screen of FIG. 6, with a "Recommended Adapter" field.

The screen of FIG. 6 can also be used to let the computer user know what the recommended adapter is. Tool 102 includes a routine to map the computer configuration, including data identified in the previous screen to a recommended adapter. With reference to FIGS. 6 and 7 when the "recommended adapter" button 128 shown in the lower right of the screen is pushed, the screen then identifies that recommended adapter. If the machine configuration does not map to an adapter, then the screen can display "Unknown" or if the machine configuration does not require an add on network card the screen can display "None Required" as shown in FIG. 7 at 130.

The screen 132 of FIG. 8 is used to show more information about the cards on the machine, and a respective one screen may be shown for each card listed in the screen of FIG. 6. To complete the screen of FIG. 8, the DSR verifies, among other information, that the card is on the machine and enters a cable ID.

The screen 134 of FIG. 9 is used to identify the type of migration. The DSR has four choices: (1) Inventory Only, (2) Self Install, (3) Shopping Cart Install, and (4) Not to be Migrated. "Inventory Only" means that no migration is being done at this time, and "Self Install" means that the computer user will do the install on their own. "Shopping Cart Install" means that the DSR will do the install immediately, during the visit, and "Not to be Migrated" means that this machine will not be migrated at all.

Preferably, the screen of FIG. 9 is also used to indicate whether an adapter was just installed. If there was a recommended adapter that appeared in the previous screen, and that adapter was verified as being in this machine, this option preferably appears. In the preferred procedure, the DSR indicates "yes" if this card was just installed for the client.

This, then, will be the adapter that appears in the "Adapter Installed" field 140. This field indicates "no" if this card was already in the machine. This is the case if the machine did not need a card to be installed.

FIG. 10 shows a screen 142 that is a dialogue box relating to the migration. Fields 144 and 146 are provided to show who is performing the installation and the status of the migration. A subfield is provided to show the scheduled date and time for the migration, and preferably this subfield defaults to the present time. Another field 150 is provided to show the installed hardware, which may include cables, RITs and MDOs. In addition, a field 152 is shown to keep track of the labor time used for the installation.

FIG. 11 shows a screen 154 that can be displayed when the "Shopping Cart" type of migration is selected, and this screen is used to collect data about the migration. A field 156 is provided to indicate whether the migration is complete or not, and another field 160 is provided to show the installed hardware, including cables, RITs and MDOs. A field 162 may also be used to keep track of the labor time for the migration.

Figure 12:
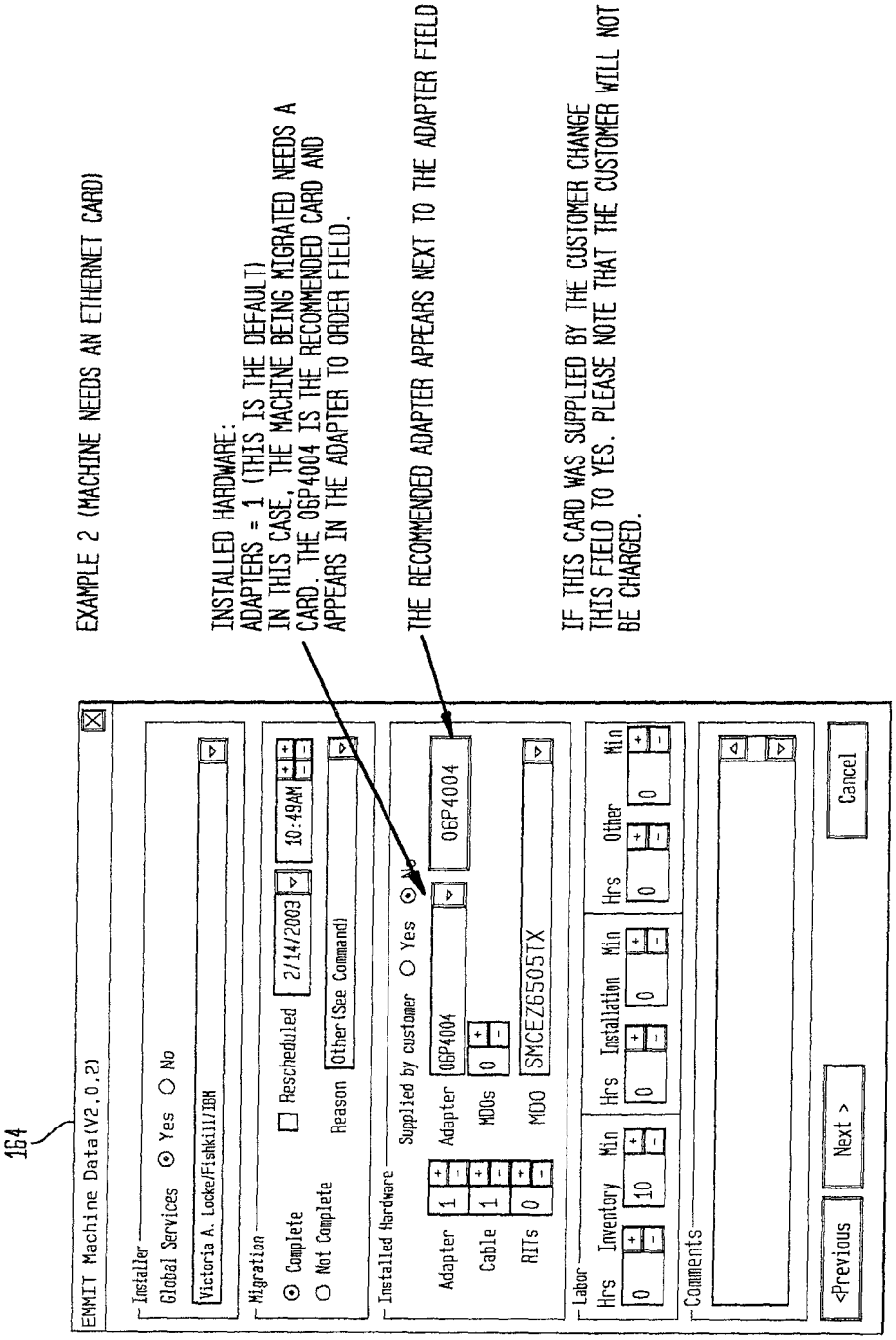
FIG. 12 shows a screen that may be used if an adapter is being installed.

FIG. 12 shows a screen 164 that is another version of the screen of FIG. 11 and that may be used if an adapter is being installed. This screen shows the recommended adapter, and includes a field for identifying the actual installed adapter.

If no migration is to occur, the screen 170 of FIG. 13 may be shown. A field 172 is provided to choose a reason for no migration, and a field 174 may be provided to keep track of the amount of time used for the inventory.

Figure 14:
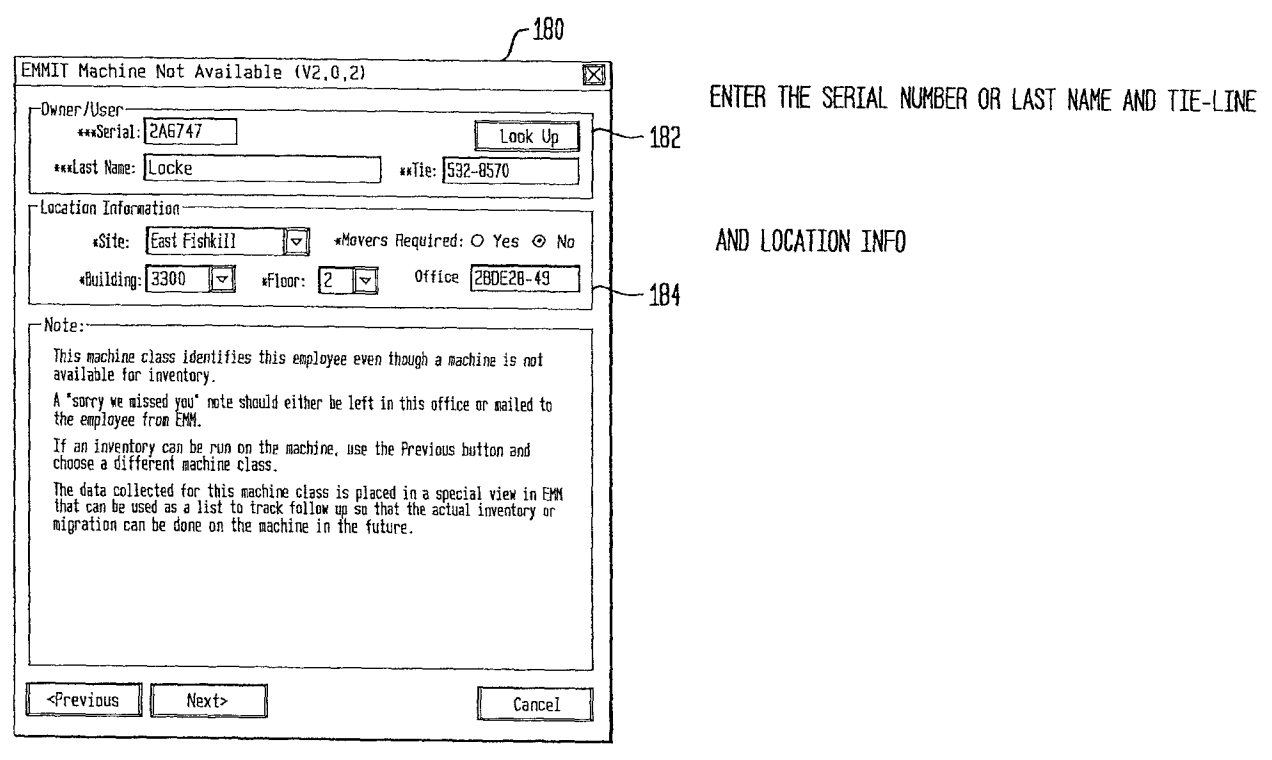

FIG. 14 shows a screen 180 used to input data if the computer user is not available. Fields 182 and 184 are provided to identify the user name and other user information, and to identify the location of the machine.

Figure 15:
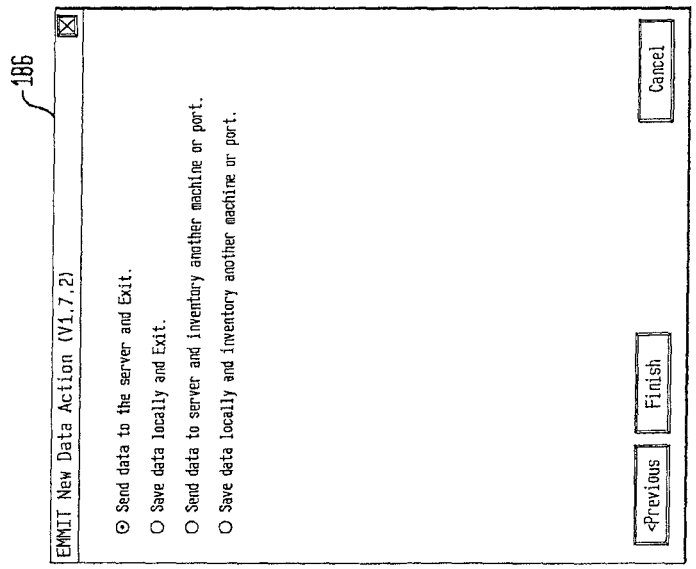
FIG. 15 illustrates a screen that may be used to provide instructions to the inventory tool.

FIG. 15 shows a screen 186 that is used to instruct the tool about what to do with the collected inventory data. As indicated on the screen, the DSR has four options: (1) send the data to the server and exit; (2) save the data locally and exit; (3) send the data to the server and inventory another machine or port; and (4) save the data locally and inventory another machine or port. Preferably, if the data is saved locally and the DSR later wants to send the data to the server, this can be done by executing the tool again. When re-executed, the tool will ask the DSR if they want to send the data that is saved to the server.

Screen 190 of FIG. 16 shows a list of special needs that a particular machine may have. A variety of needs may be shown on this screen, and, in the preferred embodiment, this list is determined by entries in the INI control file used by the inventory tool.

FIG. 17 shows, as an example, inventory data that may be collected using the inventory tool. As shown in this Figure, this data may include information about the ports, the machine, the adapter, the network, scheduling, and other general information.

In accordance with another aspect of this invention, a procedure is provided for downloading inventory data tool 102 over a network such as the Internet. As mentioned above, in a preferred procedure, a Desk Side Representative manually uses the inventory tool to collect the inventory data for the computers of a network. As an alternative, the inventory collection tool can be downloaded to the computers of the network, and each computer can use that tool to collect the desired inventory data about itself. For example, the tool may be stored on a Web site and downloaded there from over the Internet. This alternative procedure may be used if, for instance, one or more of the computers was missed by the DSR—that is, for one reason or another, the DSR did not collect the needed data from one or more of the computers.

Figure 18:
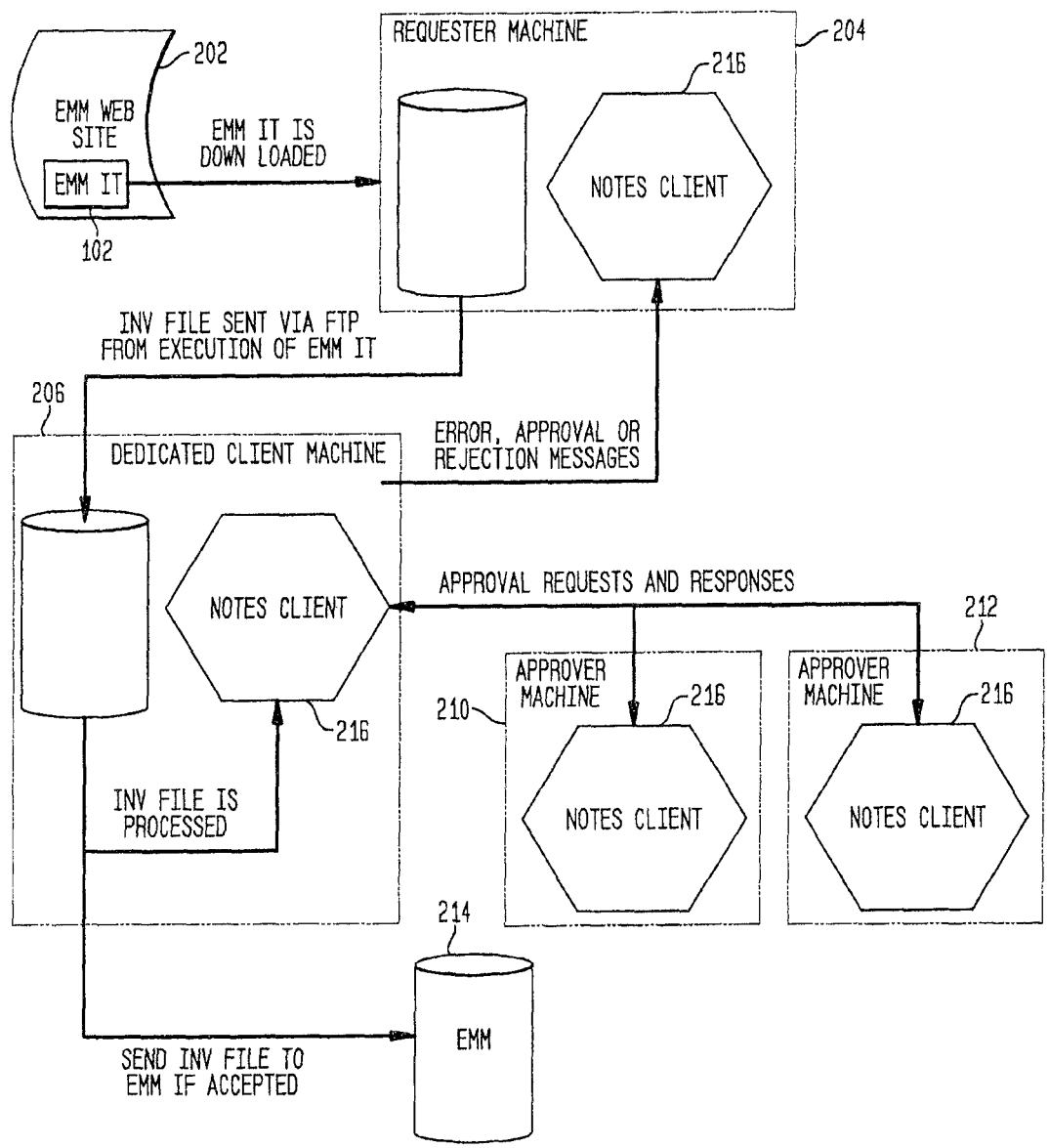
FIG. 18 illustrates a procedure for downloading an inventory tool over a network and for processing an inventory file generated by that tool.

FIGS. 18-21 illustrate this alternate inventory data collection procedure. FIG. 18 provides an overview of the procedure, and FIGS. 19-22 show in more detail various parts of the procedure. Generally, FIG. 18 shows Web site 202, which holds inventory tool 102, a requestor machine 204, a dedicated client machine 206, approver machines 210 and 214, and storage server 214.

In operation, the inventory tool 102 is downloaded from the Web site 202 to a computer 204 that requests the tool, and this computer then executes the tool to generate an inventory (INV) file that is then transmitted to the dedicated client machine 206. This dedicated client machine is a computer on the network that is running software in the Notes Client 216 that enables it to process the INV files sent from the requester machine 204. If the appropriate approval is received from the approver machines, and it is otherwise appropriate to process the INV file, that file is then sent to server 214. This server may be part of Web site 202, or it may be a stand alone server. Also, during the above-described process, messages may be sent, as represented at 216, among machines 204, 206, 210 and 212.

Figure 19:
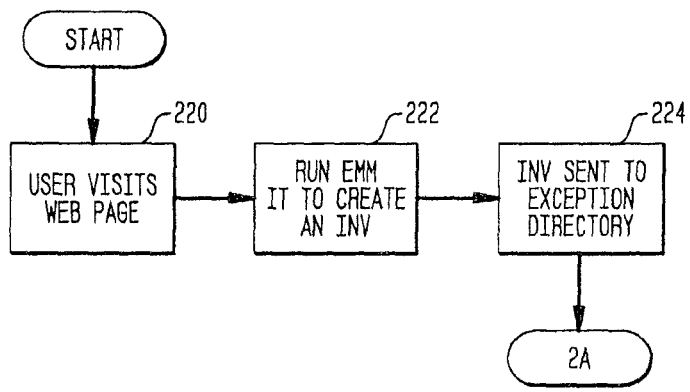
FIG. 19 shows in more detail a first part of the procedure illustrated in FIG. 18.

FIG. 19 illustrates in more detail a first part of this process. More specifically, as represented at 220, at the start of this process, a user visits a Web page at Web site 202 to obtain the inventory tool. That tool is downloaded to requestor machine 204 that, as represented at 222, executes the tool to create an INV file. As represented at 224, when this file is created, it is stored using FTP on the dedicated client machine in a directory, referred to as the exception directory, which is a directory set up for this purpose.

Figure 20:
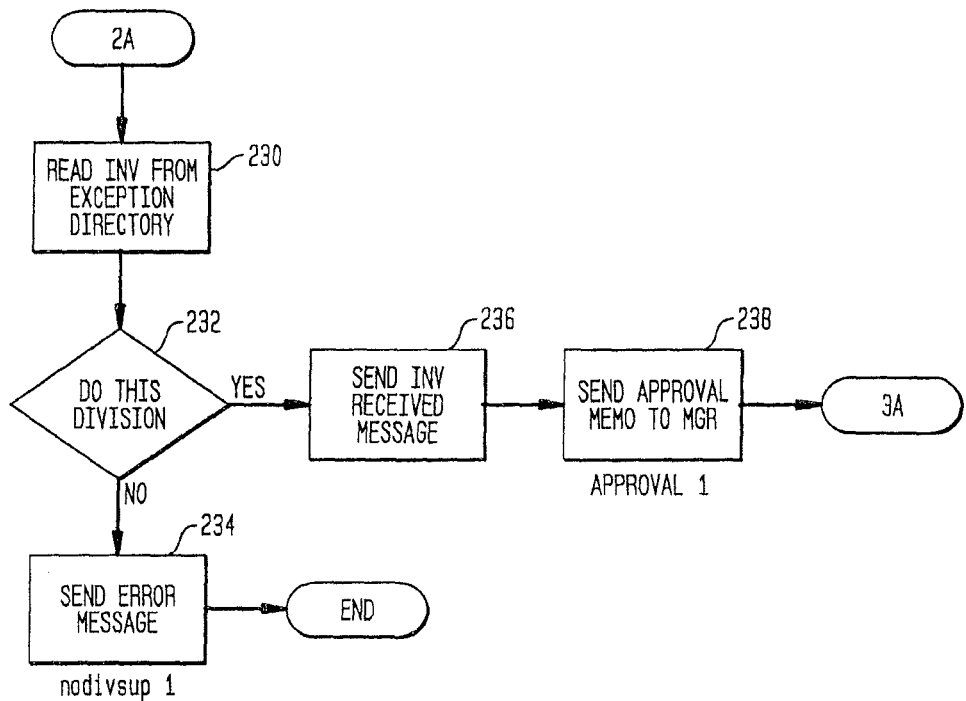
FIG. 20 shows a first part of the role of a dedicated client machine in the procedures of FIG. 18.

FIG. 20 shows in more detail the role of the dedicated client machine 206. At step 230, this machine reads the INV file that was saved by the requestor machine 204. As represented at 232, the dedicated client machine then determines if the INV file is from a machine that belongs to a division that is being migrated. If not, then at 234, an error message is sent back to the requestor machine and the procedure ends. However, if the division is being migrated, the procedure moves on to block 236, where an INV received message is sent back to requestor machine 204. Then, at 238, the client machine 206 sends a first approval request to approver machine 210.

Figure 21:
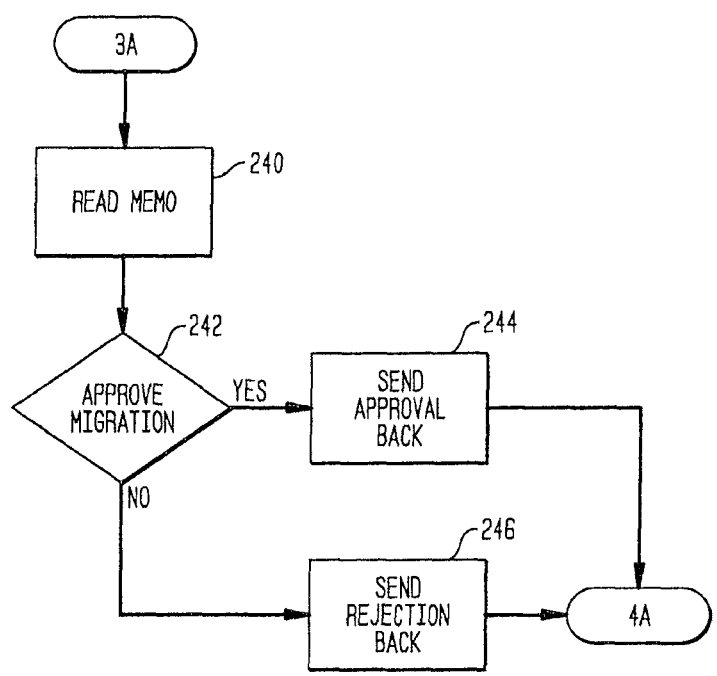
FIG. 21 illustrates an approval process used in the procedure of FIG. 18.

Approver machine 210 follows the sub-procedure of FIG. 21. At 240, the machine reads the request for approval; and at 242, that request is either approved or rejected. In either case, and as represented at 244 and 246, notification of the decision is sent back to the dedicated client machine 206.

Figure 22:
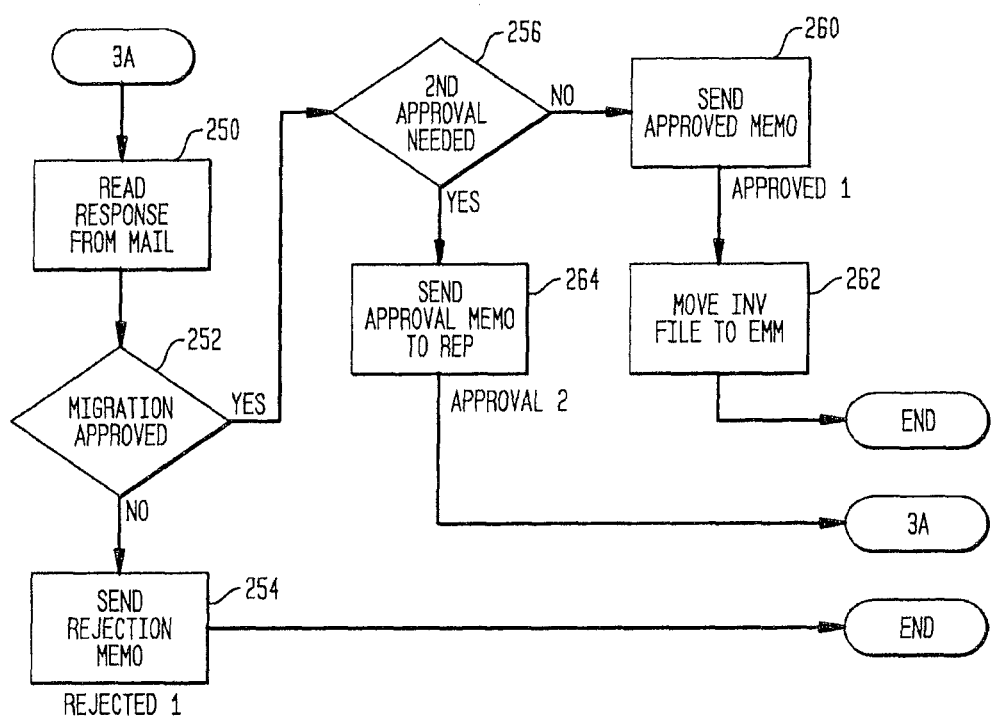
FIG. 22 shows another part of the role of the dedicated client machine in the process of FIG. 18.

The dedicated client machine 206 then proceeds as shown in FIG. 22. At 250 and 252, the machine reads the response from the approver machine 210 and determines whether that response is an approval or a rejection. If the response is a rejection, then at 254, a memo to this effect is sent back to the requestor machine 204, and the procedure ends. If the response is an approval, then at 256, the client machine determines if an additional approval is needed. If not, the client sends, at 260, a memo to this effect to the requestor machine. Then, at 262 the INV file is moved to server 214, and the procedure terminates.

However, if at 256, the dedicated client machine 206 determines that an additional approval is needed, then at 264, a request for approval is sent to second approver machine 212. This machine, following the procedure of FIG.

21, either approves or rejects the request, and sends a response, indicating this decision, back to the dedicated client machine.

Upon receipt of this response, the dedicated client machine again proceeds through the routine of FIG. 22. If the request for approval was denied, a notice to this effect is sent to the requestor machine, and the process ends. If the approval was granted, the dedicated client machine determines whether further approval is needed. If no further approval is needed, the INV file is moved to server 214, and the process ends.

In accordance with a further aspect of the invention, a control file is provided to enable users to customize information gathering per each logical group of users. The data collection tool along with control fields are made available using one of the procedures discussed above or some other procedure. The client or a desk side representative then runs the tool with the appropriate control file. The screens and questions presented to the user are then customized according to the control file so that they are appropriate for that group.

As an example, during an Ethernet migration project, at several locations it may be necessary to collect information about a large number of connections to a host from a workstation. The control file for those locations may include a "Special Needs" section so a client would be presented a list of possible special needs. At other sites, there may be no need to collect this information, so there is no "Special Needs" section included in the control files for those sites. Yet other sites may use the "Special Needs" section to collect other location specific data.

An example of a suitable control file is shown in the attached Appendix. This control file comprises a number of sections, including: Arguments; Server Information; Data Collectors List; National Language Support; Machine Class Data; Machine Usage Data; Prefill Executable Definition; Static IP Address Justifications; No Migration Reasons; Supported Adapter Names; Installer List; Install Adapter Rules; Default Values; Site, Building and Floor Definitions; Input Checking Rules; Special Needs; Ship To For Mobile; MDO Devices; Not Complete Reasons; and Including Other INI Files.

The Arguments section provided several initialization parameters and settings, and the Server Information Section identifies the destination server to which the collected data is sent. The Data Collectors list section provides a list of data collectors, and the National Language Support Section is used to ensure that the collection tool uses the appropriate language. The Machine Class Data section defines possible selectable values for each machine class, and the Machine Usage Data section defines what the returned values will be when a machine usage is chosen. The Prefill Executable Definition section provides the information needed to prefill various fields, and the Static IP Address Justification section defines the list of justifications that can be selected for the need for a static IP address.

The No Migration Reasons section defines a list of reasons that a migration could not be done, and the Supported Adapter Names section gives a list of the supported adapter drive names that would be found by the tool. The Installer List section defines a list of installers, and the Install Adapter Rules section provides rules that are used to determine what adapter needs to be used during an install on a particular machine type and model. The Default Values section is used to define the install initial input values when data for a new machine is being collected; and the Sites, Building and Floor Definitions section is used to define a list of sites, buildings and floors available to the user.

The Input Checking Rules section defines the input checking rules for each text input field, and the Special Needs section lists a series of checkable items that a site needs to query during inventory. The Ship To For Mobile section contains settings that define the States of Provenance in the Ship To section of the mobile tool, and the MDO device section gives a list of Multiple Device Offering devices that can be selected when indicating what device was delivered to a desktop. The Not complete Reasons section defines a list of reasons that the migration may not be completed, and the Including Other INI Files section allows one control INI file to include other control INI files.

Figure 23:
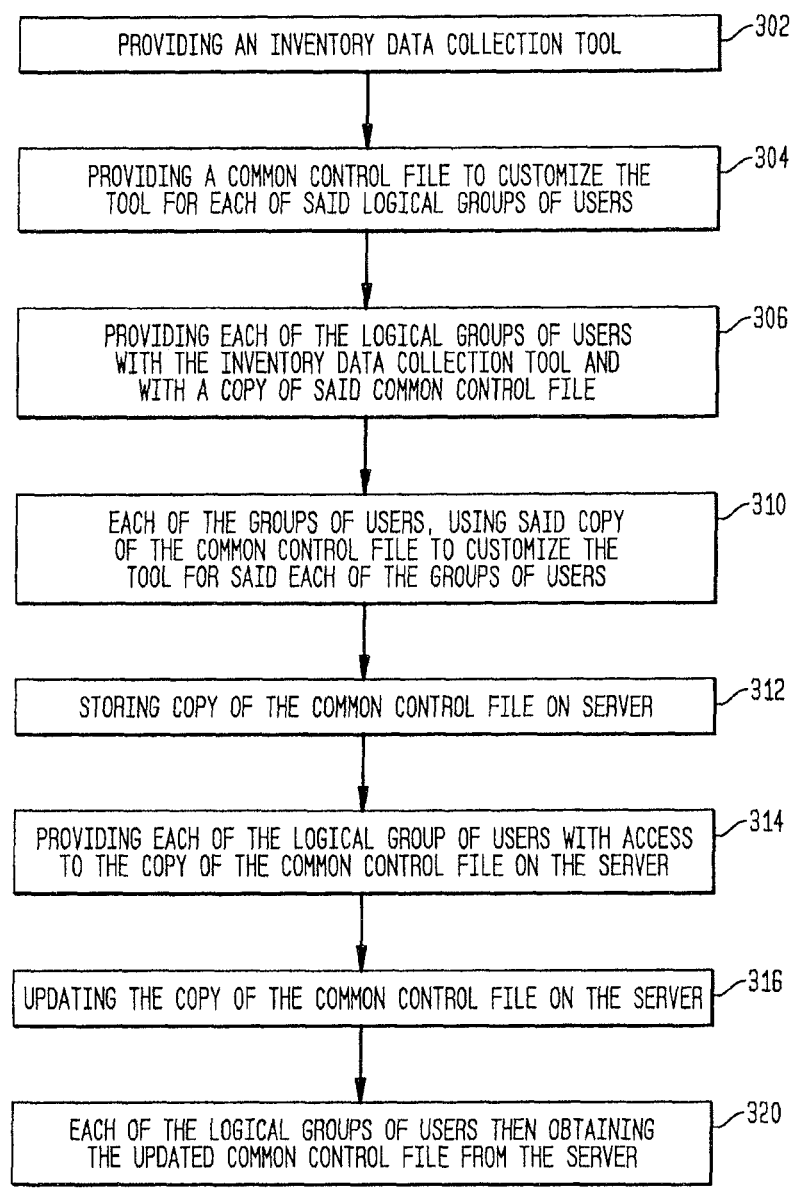
FIG. 23 is a flow chart outlining a preferred method for using a Control INI file in the implementation of the present invention.

FIG. 23 is a flow chart illustrating a preferred procedure for using this Control INI file. In this preferred procedure, at steps 302 and 304, respectively, an inventory data collection tool, and a single, common control file are provided. At step 306, each logical group of users is provided with the inventory data collection tool and a copy of that common control file. Each logical group of users can, as represented at 310, then use the common control file to customize the tool for that groups own inventory data collection process.

Also, in a preferred embodiment, as indicated at steps 312 and 314, the common control file is stored on a server, and each of the logical groups of users has access to that copy of the control file. In this way, when it is necessary or appropriate to update the control file it is necessary to update only the copy on the server, as represented at 316. Each of the logical groups of users can, as represented at 320, then obtain the updated common control file from the server.

The users do not have to use that updated control file, though. The users have a choice of using the copy of the control file already on the inventory data collection tool, or using the updated copy from the server. Preferably, if the user uses the copy of the control file already on the tool, the user is warned that he or she is using this copy and not the copy of the control file from the server.

As will be readily apparent to those skilled in the art, the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized.

The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

APPENDIX

EMM IT Control INI File

The INI file controls all of the configurable features of the Ethernet Migration Manager Inventory Tool (EMMIT) or Ethernet Migration Manager Inventory Tool (Mobile EMMIT) This document describes the format of this file and what it controls.

Friday, Sep. 5, 2003
  Arguments
  Server Information
  Data Collectors List
  National Language Support
  Machine Class Data
  Machine Usage Data
  Prefill Executable Definition
  Static IP Address Justifications
  No Migration Reasons
  Supported Adapter Names
  Installer List
  Install Adapter Rules
  Default Values
  Site, Building and Floor Definitions
  Input Checking Rules
  Special Needs
  Ship To for Mobile
  MDO Devices
  Not Complete Reasons
  Including other INI Files
Arguments
  The following arguments may be passed to the EMM executable. The arguments will override any INI values
  noprefill
    Do not preload the tool with current machine information.
  helppath
    Specify the local path to be used for help file testing.
  seated
    Identifies this user as a seated employee being sent the mobile version of the tool. The machine class becomes Seated Laptop.
Server Information
  The [Server] section defines the destination server. The collected data is sent to this server when instructed to do so by selecting the appropriate option on the Action dialog.
  The following values are defined in this section;
  address
    The TCP/IP address of the server that will collect the machine data.
  UserID
    The User ID on the collection server.
  Password
    The password for the user on the collection server, hashed value.
  DataPath
    The FTP path where the collected data is to be placed.
  ArchiveEXT
    The extension to be placed on the data files after they are moved to the server. If no extension is specified then the file is removed after being sent.
  FileLocation
    Override the default location for INV, memory and archive files.
  UseMemory
    Yes or No to determine if a memory file will be used/created to remember some of the input values from use to use of the tool.
  ShipTo
    Controls the Ship To dialog on the mobile tool, Yes=always display it, No=never display it, Auto=display it according to the operating system.
  PersonalRITs
    Controls whether the personal RITs question is asked even if the machine class is laptop. Yes=ask the question if the machine class is laptop (default), No=do not ask the question.
  HelpSite
    The server and location for on line help implemented as HTML
  Selfinstall
    Controls whether the self install option is available. Yes=allow the self install option, No=do not allow the self install option (default).
  Seated
    Yes or No to tell the mobile tool if this employee is seated or not. The default is No.
Data Collectors List
  The [Collectors] section defines the list of data collectors that will be in the drop down on the General Data dialog. Each non blank line in this section will be one collector ID in the list.
National Language Support
  The [NLS] section is used to ensure that the collection tool and the Notes database are in sync as far as the returned values for any value that might have language considerations. If this section does not exist then the English defaults will be used for each. Normally this section is not modified by an end user.
  The following values;
  Yes
    The value returned whenever a Yes response is needed.
  No
    The value returned whenever a No response is needed.
  BlockedPort
    The value returned as the port ID when it is blocked and the inventory personnel can not read it.
  UnknownSerial
    The value returned as the MachineSerial if it is not known at the time the inventory was taken.
  UnknownOwner
    The value returned in the OwnerSerial if the owner is not known at the time the inventory was taken.
  StaticPrinterJustification
    The justification that will be given to all network printers.
  IBM
    The name of IBM to be used to check for an IBM manufacturer
  CC The country code, used for blue pages look up.
AdapterDelivered
The text string that is used to indicate that a card was delivered for self install.
AdapterNotDelivered
The text string that is used to indicate that a card was required but not delivered for self install.
AdapterNotRequired
The text string that is used to indicate that a card is not required for self install.
StatusOpen
The status to pass back when the new document is to be in the open status in EMM.
StatusPending
The status to pass back when the new document is to be in the pending status in EMM.
StatusNoMigration
The status to pass back when the new document is to be in the NoMigration status in EMM.
StatusComplete
The status to pass back when the new document is to be in the Complete status in EMM.
SerialNothiBluePages
The incomplete reason that is automatically chosen if the users serial number is not found in Blue Pages.
MachineNotAvalable
The incomplete reason that is passed back when the employee/machine is not available.

Machine Class Data

Each machine class has a section that defines possible selectable values for that class. The following values can be defined for a class;
ID
The Class ID that is returned to the database in the MachineClass value.
OS
Each operating system and operating system version that can be selected will be defined with this value. The format of this is as follows;
OS=del name del selfinstall del ver1 del ver2 del . . .
Where;
del
A single character that will be used as a delimiter for the rest of the data.
name
The name given to the operating system.
selfinstall
Determines if a self install can be done by a user of this operating system. Yes indicates that a self install can be done, No indicates that it can not.
ver1 . . . ver2
The version numbers displayed in the list for this operating system.
Card
Each card name that can be selected for this class will be defined with this value. The part number of the card can be included if it is at the beginning of the name and enclosed in < > characters.
Manufacturer
Each manufacturer that is placed in the selection list for this class will be defined with this value.
The machine class sections are;
[ClassDesktop]
Class definitions for desk top machines.
[ClassLaptop]
Class definitions for lap top machines.
[ClassRISC]
Class definitions for RISC workstations.
ClassPrinter]
Class definitions for network printers.
[ClassPort]
Class definitions for network ports.
[ClassOther]
Class definitions for any other type of machine.
[ClassMobile]
Class definitions for the mobile EMM IT
[ClassNotAvailable]
Class definitions for the case where the machine is not available. The class ID is the only piece of class data that is used by this class.

Machine Usage Data

Each machine usage has a section that defines what the returned values will be when a usage is chosen. Within each of these sections the following values are defined;
ID
What is to be returned in the MachineUsage value.
Form
The form that will be used to display/edit the data in the Notes database.
The following usage sections may exist;
[UseNotes]
The usage information for a primary notes workstations.
[UseLab]
The usage information for the test/lab/manufacturing machines.
[UsePrinter]
The usage information for a network printer.
[UsePort]
The usage information for a network port only.
[UseOther]
The usage information for any other machine usage.
[UseMobile]
The usage information for a mobile machine.

Prefill Executable Definition

The [Prefill] section to define the information required to prefill fields from ISAM and Blue Pages data.
URL
The URL used to look up bluepages information.
QipURL
The URL used to look up the host name in the name server.
ISAMFile
The name of the ISAM file with the owner/user serial number in it.
OnStartUp
Do you want the data to be preloaded when the application starts, Yes or No, the Mobile version always preloads.

Static IP Address Justifications

The [Static Justifications] section defines the list of justifications that can be selected for the need for a static IP address. Each of the non blank lines in this section will be one of the justifications in the list.

No Migration Reasons

The [No Migration Reasons] section defines the list of reasons that a migration could not be done. Also whether additional comments are required is also defined for each reason in the list. Each reason entered in this section has the following format.

reason=required

Where:

reason

The description of the reason, this will appear in the drop down.

required

Yes if the additional comment is required, No if not.

Supported Adapter Names

The [Supported Adapters] section defines a list of the supported adapter driver names that could be found by the tool. If an adapter is found with this name in the registry then it will be flagged with an indicator that it is a supported card. Each adapter is a single line within this section with the following format.

card=drivername where:

card

The part number of the card that uses this driver name.

drivername

The driver name that is placed in the registry for this card.

Installer List

The [Installers] section defines the list of installers that will be on the Installer drop down on the Migration Data dialog. Each non blank line in the section becomes one of the installers in the list. If this section is missing, the Data Collector List will be used.

Install Adapter Rules

The [Install Adapter Rules] section defines the rules that are used to determine what adapter needs to be used during an install on a particular machine type and model. Each rule is a single line within this section with the following format.

card=del selfinstall del model type del model type . . .

where:

card

The card to install in the machine.

del

A single character that will be used as a delimiter for the rest of the data.

selfinstall

This flag determines if this adapter can be used to do a self install. Yes indicates that it can No if it can not.

model

The 4 digit model of the machine being looked up. The model/type pair can be repeated providing a list of machines that will take this card.

type

The 3 character type of the machine being looked up.

Default Values

The [Defaults] section is used to define the initial input values when data for a new machine is being collected.

Values that control checking for all templates;

PreSelect

The character specified here is used as the character that is preselected when you tab to one of the fields that can be defaulted.

Values for the General Data dialog;

CollectorID

The Data Collector ID to select from the list. If this ID is not in the list then the first ID is selected.

MachineClass

The initially selected Machine Class. One of the following;

Desktop

Select Desktop PC. With the mobile tool this changes the class to Seated Desktop.

Laptop

Select Laptop PC. With the mobile tool this changes the class to Seated Laptop.

RISC Workstation

Select RISC Workstation.

Network Printer

Select Network Printer.

Network Port Only

Select Network Port Only.

Other

Select Other.

RITs Only

This class is used by the mobile tool to indicate that it should collect data for a previously migrated client requesting a personal RiT.

MachineUsage

The initially selected Machine Usage. One of the following;

Primary Notes Workstation

Select Primary Notes Workstation.

Lab/Manufacturing/Tester

Select lab/Manufacturing/Tester.

Other

Select Other.

Comments

The text to prefill into the Comments field.

Values for the Machine Data dialog;

OwnerSerial

The Owner/User Serial.

OwnerLName

The Owner/User Last Name.

OwnerTie

The Owner/User Tie or internal phone number.

Site

The Location Information Site.

Building

The Location Information Building.

Floor

The Location Information Floor.

Office

The Location Information Office.

MoversNeeded

The value for Location Information Movers Needed, Yes if movers are needed to move furniture, No if not.

MachineManufacturer

The Machine Information Manufacturer.

MachineSerial

The Machine Information Serial.

MachineType

The Machine Information Type.

MachineModel

The Machine Information Model.

OS

The initially selected Machine Information OS or operating system. If this value is not in the list available then the first OS in the list will be selected.

OSVersion

The operating system version. If this value is not in the list then the first available version in the list will be selected.

Values for the Network Data dialog
CableID
The Cable ID, the number on the wall port.
StaticIPRequired
Is a static IP address required, Yes or No
StaticJustification
The justification to be used for the need for a static IP address.
Address
The TCP/IP Address.
HostName
The Host Name.
CardName
The name of the card
Splitter
Is there a splitter connected to the wall port, Yes or No
Values for the Supplemental Data dialog
TesterName
The Tester Name.
Manufacturer
The Hardware Manufacturer.
ManufacturingSup
The Support Personnel Manufacturing Engineering.
OSSup
The Support Personnel Operating System.
HardwareSup
The Support Personnel Hardware.
Values for the Migration Type dialog in the non mobile version.
AskForMigrationType
Should the dialog be displayed that asks for the type of migration desired.
InstallType
The type of install as follows.
Inventory
Recording an Inventory only.
ShoppingCart
Recording a shopping cart install.
NoMigration
No migration will be done on this machine
Values for the MigrationData dialog.
IGSInstaller
Yes if the installation was done by IGS, otherwise No.
Installer
The name of the installer.
ScheduledDate
The date that the install will or has taken place . . . mm/dd/yyyy format.
ScheduledTime
The time that the install will or has taken place . . . mm:ss format.
Complete
Yes if the migration installation is complete, otherwise No.
ReScheduled
Yes if the migration has been rescheduled, No otherwise.
ReasonNotComplete
The reason that the migration is not complete.
CustomerSupplied
Yes if the card was supplied by the customer, No if IGS supplied the card.
Adapter
The part number of the adapter that is delivered for a self install.
Adapters
The number of adapters delivered to the user.
Cables
The number of cables delivered to the user.
MT
The number of RIT connectors delivered to the user.
MDO
The name of the MDO device that is delivered.
MDOs
The number of delivered MDO devices.
InventoryHrs
The number of hours spent on inventory.
InventoryMin
The number of minutes spent on inventory.
InstallHrs
The number of hours spent on installation.
InstallMin
The number of minutes spent on installation.
OtherHrs
The number of hours spent on other tasks.
OtherMin
The number of minutes spent on other tasks.
Values for the New Data Action dialog.
Action
Define the default action, one of the following;
SendExit
Send the data on the server and exit.
SaveExit
Save the data on diskette and exit.
SendMore
Send the data on the server and take another inventory.
SaveMore
Save the data on diskette and take another inventory.
Values for the Ship To dialog on the mobile version
ShipToCountry
The country name. default values are United States (US) and Canada.
ShipToFName
The users first name as it is to appear on the shipping label.
ShipToLName
The users last name as it is to appear on the shipping label.
ShipToAddress 1
First line of the address as it is to appear on the shipping label.
ShipToAddress2
Second line of the address as it is to appear on the shipping label.
ShipToCity
The name of the city as it is to appear on the shipping label.
ShipToState
The state or province selected from the list provided according to the ShipToCountry.
ShipToZip
The zip code or postal code as it is to appear on the shipping label.
ShipToPhone
The phone number of the contact person for the shipment.
Site, Building and Floor Definitions
The [Sites] section defines the list of sites, buildings and floors available to the user in the drop down selections. Each building on a site is defined as a line in this section as follows;
site=del building del floor del floor
Where;
site
The site name as it will appear in the list.
del A single character delimiter used between the building and each floor name building The name of the building as it will appear in the list for this site being defined on this line.

floor

The name of one of the floors, as it will be displayed in the list, in the building being defined on this line/

Input Checking Rules

The [Checking Templates] section defines the input checking rules for each text input field. The approach for input checking is to have a series of legal templates. If the data input in the field matches any of the templates then it is considered legal and no error is issued. If the data entered does not match any of the templates then the error message specified is issued and the user must correct the data before saving the data.

The set of templates for each field is entered on a separate line of the NI file in the following format;

field=del message del template del template . . .

Where:

del

A single character that is used as the delimiter between the message and each template for this field.

field

The name of the field who's template is being defined message

The error message to display when this template

The template for that field

Within the templates the following characters are used to determine the character type considered legal. If the template is one character long then that character determines the data type of the entire input field. Characters other than these must appear as is, disregarding case.

*

Either a number or alpha

@

Only alphas a-z

Only numbers 0-9

The field names that are checked using the templates are listed below;

Values for the Machine Data dialog;

OwnerSerial

The Owner/User Serial.

OwnerLName

The Owner/User Last Name.

OwnerTie

The Owner/User Tie or internal phone number.

Office

The Location Information Office.

CableID

The Cable ID, the number on the wall port.

MachineSerial

The Machine Information Serial (IBM manufacturer only).

MachineSerialNonIBM

The Non IBM machine serial number.

MachineType

The Machine Information Type (IBM manufacturer only).

MachineDescription

The Machine Description information in the mobile version.

MachineModel

The Machine Information Model (IBM manufacturer only).

HostName

The HostName.

Address

The Address.

ShipToFName

The first name on the shipping label.

ShipToLName

The last name on the shipping label.

ShipToAddress1

The first line in the ship to address.

ShipToAddress2

The second line in the ship to address.

ShipToCity

The city in the ship to address.

ShipToZip

The zip or postal code in the ship to address.

ShipToPhone

The phone number in the ship to address.

Special Needs

The [Special Needs] section list a series of checkable items that a site needs to query during inventory. The returned value, to be used in the database, and a description are entered here. If this section exists then a Special Needs dialog is displayed with each of the items on it. An inventory taker simply checks the appropriate ones and the data is returned in the inventory. Up to fifteen (15) special needs can be defined.

Each line in the section has the following syntax;

needid=description

Where:

needid

The value returned to the database if this need is checked.

description

A description of the need, to be displayed on the special needs dialog.

Ship to for Mobile

The [Shipto] section is only used by the Mobile version of EMM, it contains settings that effect the Ship To inputs. Each supported country and its States or Provenance are defined in this section as follows;

country=del state del state del state . . .

country

The country name to be included.

del

A single character delimiter used to separate each state or province name.

state

The state or province name to be included for this country.

MDO Devices

The [MDO Devices] section defines the list of Multiple Device Offering devices that can be selected when indicating what device was delivered to the desktop. Each of the non blank lines in this section will be one of the devices in the list.

Not Complete Reasons

The [Not Complete Reasons] section defines the list of reasons that the migration may not be complete. Each of the non blank lines in this section will be one of the reasons that can be chosen from the dialog in EMM IT.

Including Other INI Files

The [Include] section allows one control IN1 file to include others. Each file listed here will be included in-line and must be placed in the same directory as the EMM executable. These included files can also include other files in the same way.

The invention claimed is:

1. A method of managing a network migration from a first type of network to a second type of network, comprising:

receiving, at a computer system via an inventory tool computing process, aggregate network adapter information on a plurality of machines configured to respectively connect to the first type of network, wherein the aggregate network adapter information includes, for each of the plurality of machines, values for one or more operational parameters for a network adapter interface device of that machine, the values for the one or more operational parameters including at least one value corresponding to a type of the network adapter interface device of that machine that has been automatically gathered by the inventory tool computing process through analysis of a configuration of that machine without a user specifying the at least one value;

based on the received aggregate network adapter information, generating, by the computer system, a network inventory listing that includes the aggregate network adapter information;

determining, by the computer system for each of the plurality of machines, based on the network inventory listing and connection requirement information for the second type of network, whether that machine requires a different network hardware device in order for that machine to connect to the second type of network;

for each of the plurality of machines, determining, by the computing system, whether that machine requires different software from pre-existing software on that machine to connect to the second type of network; and providing, by the computer system, network adapter reporting information indicative of the required different network hardware device for each of the plurality of machines and reporting information indicative of the required different software for each of the plurality of machines.

2. The method of claim 1, further comprising determining, by the computer system for each of the plurality of machines requiring a different network hardware device, a recommended adapter corresponding to requirements of the second type of network.

3. The method of claim 1, wherein at least one of the plurality of machines has at least two network adapter interfaces.

4. The method of claim 1, further comprising providing a common control file to the inventory tool computing process.

5. The method of claim 4, further comprising accessing the common control file on a server, wherein the common control file includes the network inventory listing.

6. The method of claim 1, further comprising collecting, via the inventory tool computing process, information regarding how many Internet Protocol (IP) addresses are assigned to each of the plurality of machines.

7. A non-transitory machine-readable medium having stored thereon instructions which, in response to being executed by a computer system, cause the computer system to perform operations comprising:

receiving, via an inventory tool computing process, aggregate network adapter information on a plurality of machines configured to respectively connect to a first type of network, wherein the aggregate network adapter information includes, for each of the plurality of machines, values for one or more operational parameters for a network adapter interface device of that machine, wherein at least a portion of the aggregate network adapter information is gathered automatically without a user needing to provide a manual input, wherein the portion includes at least one value for the one or more operational parameters for each of the plurality of machines;

based on the received aggregate network adapter information, generating an inventory listing that includes, for each of the plurality of machines, the values for the one or more operational parameters for the network adapter interface device of that machine, wherein the values are indicative of whether that machine needs a different network hardware device to be installed in order for that machine to connect to a second type of network;

for each of the plurality of the machines, determining whether that machine requires different software from pre-existing software on that machine to connect to the second type of network; and providing the inventory listing and reporting information indicative of the required different software for each of the plurality of machines to one or more dedicated client machines.

8. The non-transitory machine-readable medium of claim 7, wherein the operations further comprise gathering customized information for each of the plurality of machines based on whether that machine is associated with a particular logical group of users.

9. The non-transitory machine-readable medium of claim 7, wherein the operations further comprise collecting information, for each of the plurality of machines, on whether additional hardware other than a network adapter device is needed for that machine to connect to the second type of network.

10. The non-transitory machine-readable medium of claim 7, wherein the operations further comprise, for a sub-group of machines within the plurality of machines, gathering information on whether each machine in the sub-group requires multiple connections to a particular host machine on the second type of network.

11. The non-transitory machine-readable medium of claim 7, wherein the inventory tool computing process is downloaded over a network to at least one machine in the plurality of machines of the group.

12. The method of claim 1, wherein the second type of network is an Ethernet network and the first type of network is a different type of network.

13. The method of claim 1, wherein the first type of network is an Ethernet network and the second type of network is a different type of network.

14. The method of claim 1, further comprising gathering customized information for each of the plurality of machines based on whether that machine is associated with a particular logical group of users.

15. The method of claim 1, further comprising collecting information, for each of the plurality of machines, on whether additional hardware other than a network adapter device is needed for that machine to connect to the second type of network.

16. The method of claim 1, further comprising gathering, for a sub-group of machines within the plurality of machines, information on whether each machine in the sub-group requires multiple connections to a particular host machine on the second type of network.

17. The method of claim 1, wherein the inventory tool computing process is downloaded over a network to at least one machine in the plurality of machines.

18. The non-transitory machine-readable medium of claim 7, wherein the operations further comprise providing a common control file to the inventory tool computing process.

19. The non-transitory machine-readable medium of claim 18, wherein the operations further comprise accessing the common control file on a server, wherein the common control file includes the network inventory listing.

20. The non-transitory machine-readable medium of claim 7, wherein the operations further comprise collecting, via the inventory tool computing process, information regarding how many Internet Protocol (IP) addresses are assigned to each of the plurality of machines.

\* \* \* \* \*

UNITED STATES PATENT AND TRADEMARK OFFICE
CERTIFICATE OF CORRECTION

PATENT NO. : 9,928,480 B2
APPLICATION NO. : 14/444869
DATED : March 27, 2018
INVENTOR(S) : Carol I. DelGaudio et al.

Page 1 of 1

It is certified that error appears in the above-identified patent and that said Letters Patent is hereby corrected as shown below:

In the Claims

In Claim 11, Column 24, Line 44, change "plurality of machines of the group." to --plurality of machines.--.

Signed and Sealed this
Fifth Day of June, 2018

Andrei Iancu
*Director of the United States Patent and Trademark Office*